June 3, 1952  T. K. STEVENSON  2,599,139
APPARATUS FOR SEPARATING SOLIDS FROM CURRENTS OF GASES
Filed Oct. 5, 1949  3 Sheets-Sheet 1

INVENTOR.
THOMAS K. STEVENSON
BY
George Rex Frye
Attorney

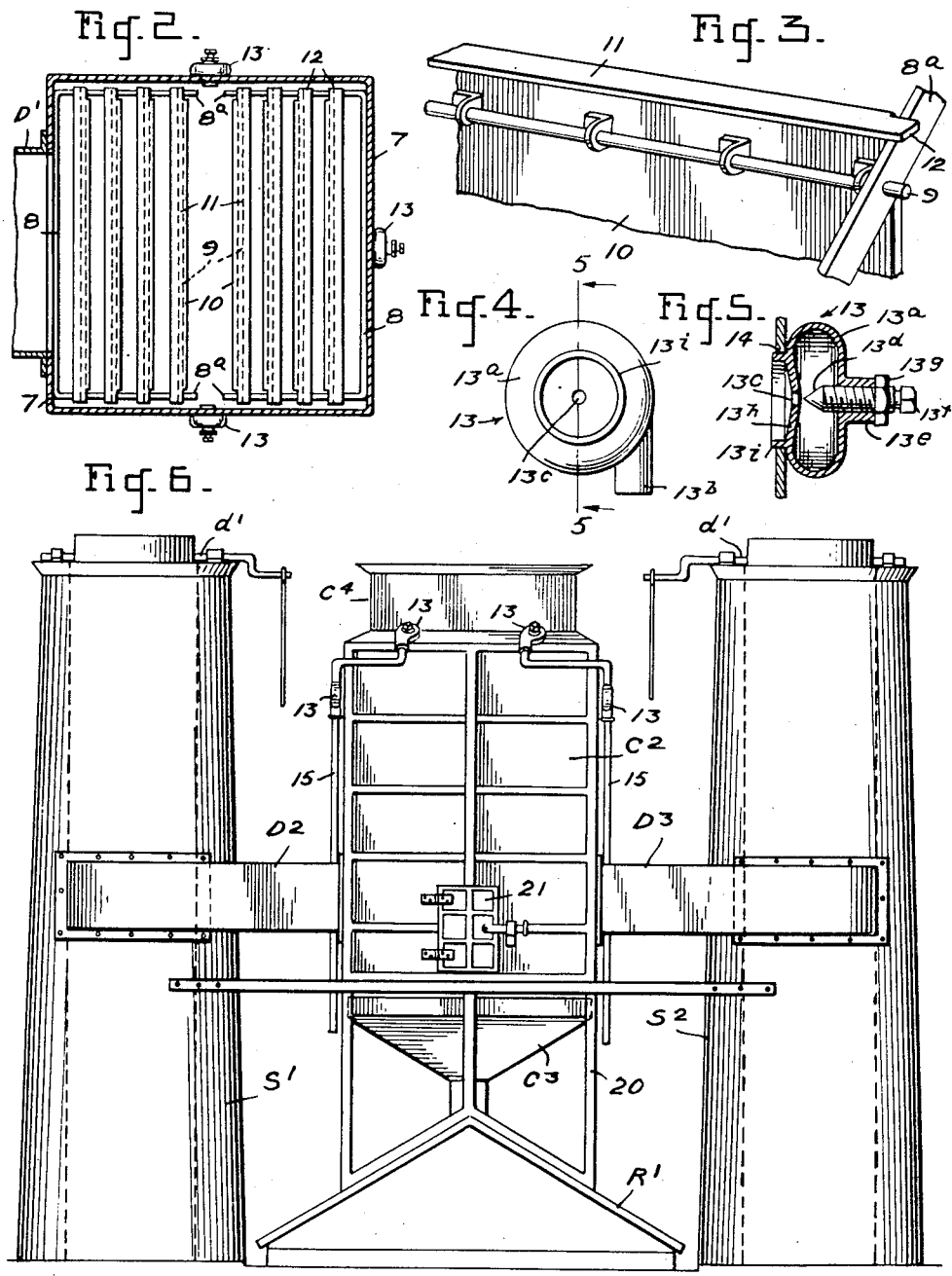

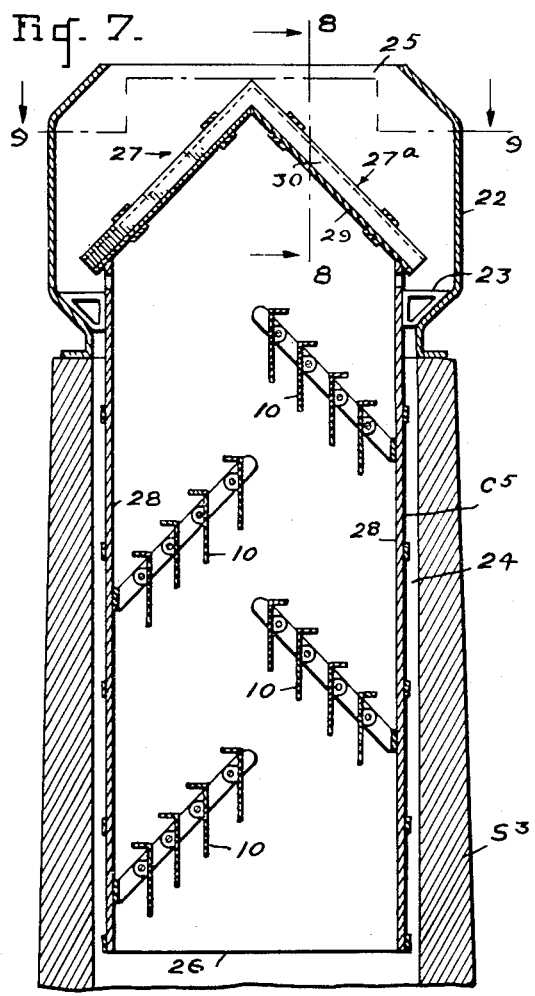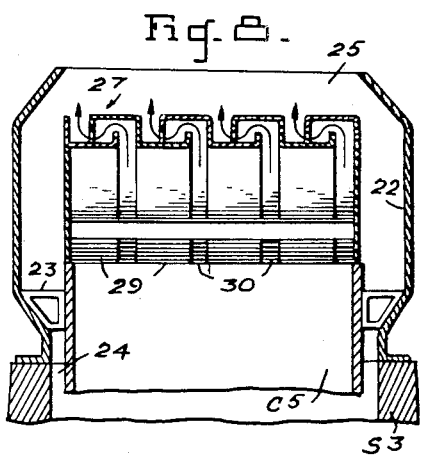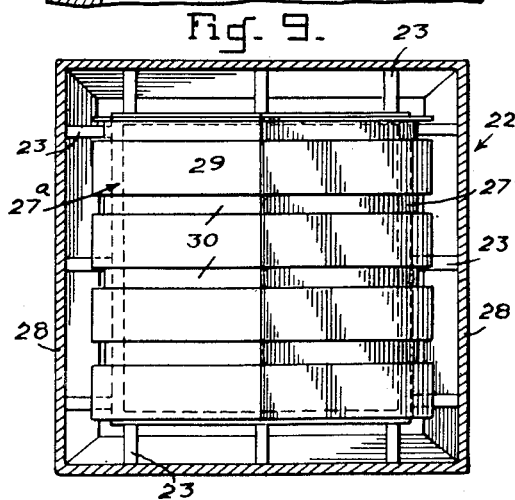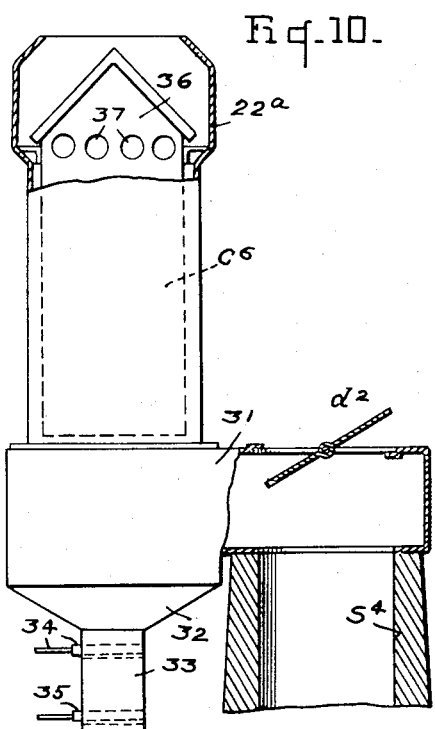
INVENTOR.
THOMAS K. STEVENSON.
BY George Rex Frye.
Attorney.

Patented June 3, 1952

UNITED STATES PATENT OFFICE 2,599,139

2,599,139

APPARATUS FOR SEPARATING SOLIDS FROM CURRENTS OF GASES

Thomas K. Stevenson, Cleveland, Ohio, assignor to National Smoke Control Corporation, Cleveland, Ohio, a corporation of Ohio Application October 5, 1949, Serial No. 119,706

9 Claims. (Cl. 183—21)

My invention relates to new and useful improvements in apparatus for separating solids from currents of gases, and more particularly to means for treating stack smoke to remove the soot, cinders and other ash particles therefrom. While the invention is primarily intended to render the escaping gases or smoke clean and harmless, it is also an object to prevent the loss of valuable substances which might be otherwise carried away by the gases or smoke.

The peculiarly novel and useful features of my device include the separation chamber through which the particle laden current of gas is caused to pass, a plurality of baffles pivotally mounted in the chamber, and means for controlling the degree of pivotal movement of the baffles. I also provide a novel system of spray heads for the water to wash down the particles and novel means for removal of the washed-down particles.

While I have illustrated in the accompanying drawings and have hereinafter fully described certain specific embodiments of my invention, it is to be distinctly understood that I do not consider my invention to be limited to said specific embodiments, but refer for its scope to the claims appended hereto.

In the drawings:

Fig. 2 is a horizontal section on line 2—2 of Fig. 1.

Fig. 3 is an enlarged fragmentary perspective view of one of the pivoted baffles.

Fig. 4 is an enlarged side elevation of one of the spray heads.

Fig. 5 is a vertical section of the spray head of Fig. 4.

Fig. 6 is a side elevation of another form of the device.

Fig. 7 is a vertical section of another form of the device.

Fig. 8 is a vertical section on line 8—8 of Fig. 7.

Fig. 9 is a horizontal section on the line 9—9 of Fig. 7.

Fig. 10 is a side elevation partly in section of another form of the device.

Figure 1:
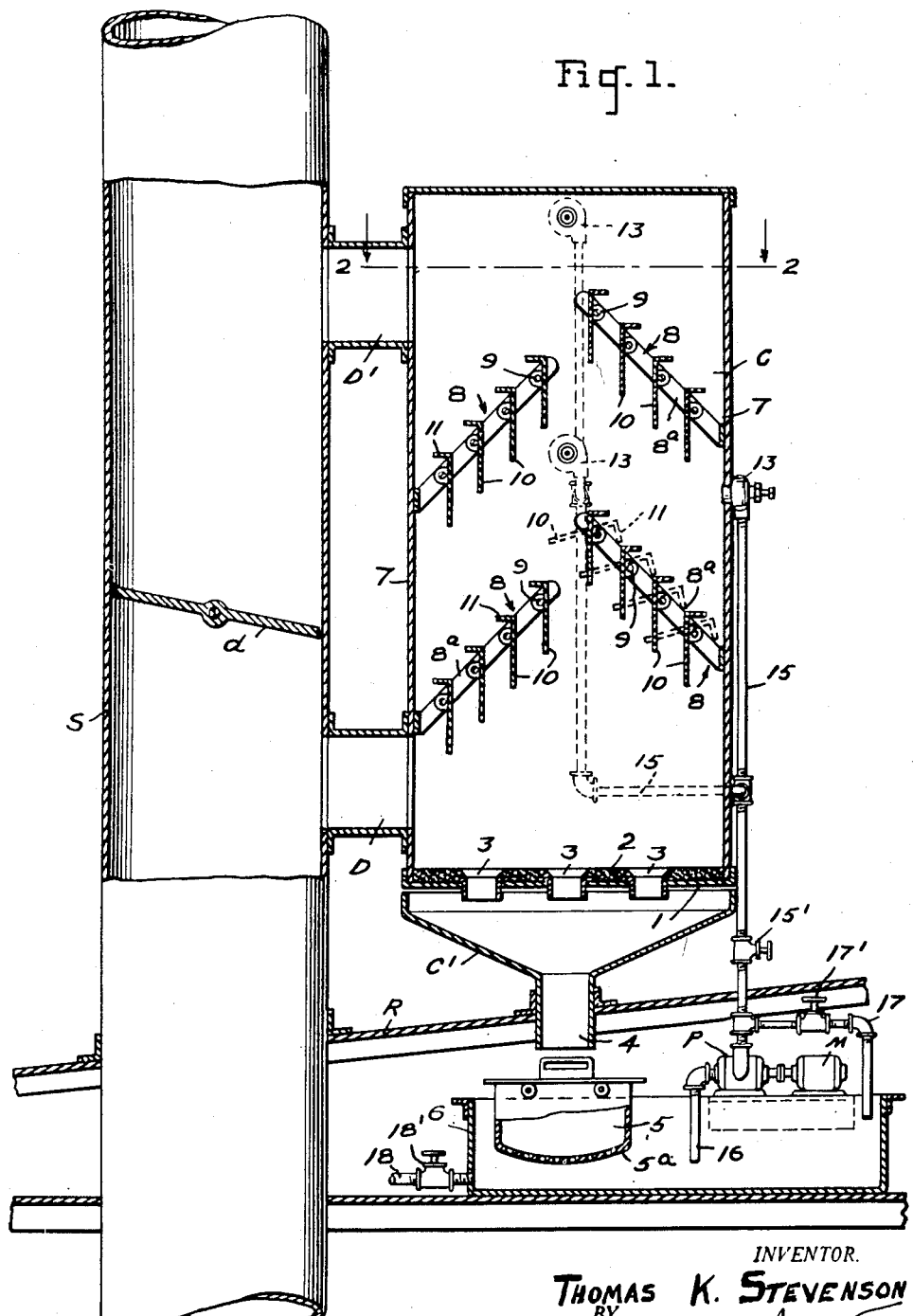
Fig. 1 is a vertical section of one form of the device.

In the form of the device shown in Fig. 1, the stack S is connected with the chamber C by intake duct D and outlet duct D-1 and has a damper d disposed therein between the ducts. The chamber C is closed at the top and has a bottom 1 provided with a floor 2 made of suitable non-corrosive material, such as concrete and having a plurality of discharge vents 3 therethrough. Suitably disposed below the chamber C, there is a hopper C-1 having a discharge conduit 4. The chamber C and hopper C-1 are suitably mounted on a roof R through which passes the conduit 4 discharging into a suitable container 5 removably mounted above a tank 6, and having a perforated bottom 5-a.

The chamber C is rectangular in cross-section (Fig. 2) and has mounted on its side walls 7 a plurality of U-shaped brackets 8, the arms 8-a of each of which carry a series of rods 9 on which are pivoted a series of baffles 10 respectively. These baffles 10 are made of suitable lightweight metal, such as aluminum. Each baffle 10 has an angular flange 11 on its upper edge having ears 12 on its ends for engagement with the arms 8-a of the brackets 8 to serve as stops when the baffles 10 are rotated about rods 9, as shown in broken lines in Fig. 1.

Each of the ears 12 projects outwardly from an end of the flange 11 to overlie the adjacent arm 8-a and provide a shoulder at the front of the ear and a shoulder at the back of the ear. The back shoulder is so related to the plane of the body of the baffle 10 that the body normally hangs substantially vertically from its pivotal connection on the rod 9 but is free to swing in one direction only, i. e., in such direction as to bring the front shoulder of the ear down toward engagement with the arm 8-a, as shown in dotted lines in Fig. 1. Movement backwards beyond the vertical plane is prevented by engagement of the back shoulder of the ear 12 with the arm 8-a.

It will be evident that instead of hanging in accurately vertical planes, each of the baffles may have one or both of its ears 12 so related to the plane of the body portion of the baffle that the body portion will hang normally in a plane slightly inclined to the vertical, in the direction toward which the baffle is free to swing to the dotted line position shown in Fig. 1.

In either case it will be evident that a rising current of gas moving at low velocity will deposit solid particles on the undersurfaces of the flanges 11, without swinging the baffles from their normal depending positions, and that a more rapidly rising current will tend to swing the baffles toward their dotted line positions. This results from the fact that any rapidly rising current necessarily includes some swirling movement having a lateral vector. Such lateral components will necessarily include, sooner or later, a vector applying pressure against what may be termed the inside of the body of each baffle, i. e., the surface on the side from which the flange 11 extends, such pressure will cause the baffle to swing to the dotted line position. As has been explained, the baffle cannot swing in the opposite direction because of the engagement of the back shoulder of the ear 12 with the arm 8-a. Once started in its swinging movement, there is no possibility of the baffle swinging back until the velocity of the current decreases, and of course it is impossible for the baffle to swing back past its vertical or substantially vertical position.

It will be appreciated that the under side of each flange 11 receives a deposit of solid particles when the current moves at a very slow rate and that such under side and the side surface of each baffle receive a deposit when the baffles swing to inclined positions. Moreover, when thus swung the baffles oppose the fast moving current and tend to retard it, thus increasing the capacity of the flange and body surfaces to receive a deposit of solid particles.

I provide, for the chamber C, a plurality of spray heads 13 (Figs. 1, 2, 4 and 5). Each head 13 comprises a round hollow body 13-a, a tangential inlet pipe 13-b, an axial discharge port 13-c, a needle valve 13-d, threaded in an axial sleeve 13-e and having an adjustable head 13-f and lock nut 13-g. The forward portion 13-h of the body 13-a, circumferential of the port 13-c, diverges outwardly to a circumferential flange 13-i fitted in an orifice 14 in the wall of the chamber C.

These heads 13 are connected by pipe 15, with valve 15', to pump P driven by motor M and having an intake pipe 16 from the tank 6. A by-pass pipe 17 with valve 17' connects pipe 15 with tank 6. Tank 6 has a supply-discharge pipe 18, with valve 18'.

In the form of the device shown in Fig. 6, the chamber C-2 and the hopper C-3, which are substantially identical in form with chamber C and hopper C-1 of Fig. 1, are mounted by means of an enveloping frame 20 on a roof R-1, between twin stacks S-1 and S-2. The chamber C-2 is connected with stacks S-1 and S-2 by ducts D-2 and D-3, respectively. The stacks S-1 and S-2 are provided with dampers d-1, and the chamber C-2 has an open throat C-4 at its top. A cleanout door 21 is provided for the chamber C-2. The chamber C-2 has spray heads 13 connected by pipes 15 with a tank (not shown) as in the form of Fig. 1.

In the form of the device shown in Fig. 7, the chamber C-5 is disposed in the stack S-3 by means of a shroud 22 mounted on top of stack S-3 and connected to chamber C-5 by a spider 23, to provide an annular space 24 between chamber C-5 and stack S-3. Shroud 22 has an open top throat 25 and chamber C-5 has an open bottom throat 26. Chamber C-5 is provided with baffles 10, as chamber C and C-2, but has no spray heads.

The chamber C-5 is rectangular in cross-section (Fig. 9) and has a gable roof 27 mounted on its side walls 28 (Fig. 7). Each element 27-a of this roof 27 comprises a plurality of baffles 29 with intermediate, sinuous discharge passages 30 therebetween (Fig. 8) connecting the interior of chamber C-5 with throat 25.

The form of the device shown in Fig. 10 has a chamber C-6, substantially identical with chamber C-5, mounted in a shroud 22-a which projects from a casing 31 mounted on top of stack S-4 and having a damper d-2. A hopper 32 is provided alongside stack S-4 under casing 31 coaxial with chamber C-6 and having a discharge duct 33 provided with a pair of slide gates 34 and 35. The chamber C-6 has in its end wall 36 ports 37 for communication between the interior of casing C-6 and the discharge throat 25 of shroud 22-a. Such ports may be supplied in casing C-5 of the form in Fig. 7.

I will now describe the use and operation of my improved device. In the form of the device shown in Fig. 1, the upward current of smoke, hot air or other gases in the stack S is by-passed by closing the damper d, to pass through duct D to the chamber C, therethrough, and through duct D-1 to the stack S. The upward flow of this current, through the chamber C, tends to swing the baffles 10 on their rods 9 to assume the position shown in broken lines in Fig. 1. It will be noted that the brackets 8 are so mounted in the chamber C as to dispose the baffles 10 pivoted thereon in staggered relation to provide a sinuous passage for the current. It will also be noted that the parts are so designed and related that the ears 12 function to limit the upward movement of the baffles 10 to prevent undue raising of the baffles 10 which would close the passage. Water, supplied from tank 6 by pump P through pipe 15 and heads 13, serves to wash down any solid matter impinging upon the baffles 10 to be precipitated to the floor 2 and pass through vents 3 into hopper C-1 and through conduit 4 to container 5.

In the form of the device shown in Fig. 6, the upward currents in stacks S-1 and S-2 can be introduced into chamber C-2 through ducts D-2 and D-3, respectively, by closing one or both of the dampers d-1. These currents receive the same treatment in chamber C-2 as that above described and escape therefrom through the throat C-4.

In the form of the device shown in Fig. 7, the upward current in stack S-3 passes upwardly through the chamber C-5. Any solid particles which may be carried by the current past the baffles 10 are trapped by the baffles 29 of the roof 27.

In the form of the device shown in Fig. 10, the upward current from the stack S-4 is deflected, by closing the damper d-2, through the casing 31 to the chamber C-6 where it is treated in the same manner as the current in the chamber C-5 above described. The solid particles removed from the current by the baffles are precipitated into hopper 32 and discharged through duct 33 by the manipulation of gates 34 and 35. Gate 34 being opened, the solids are deposited on gate 35. Gate 34 being closed, the gate 35 can be opened to discharge the solids without permitting an up-draft through duct 33.

While the herein described embodiments are believed to adequately fulfill the objects and advantages herein stated, it is to be understood that many modifications and variations may be made therein without departing from the spirit and scope of my invention, as set forth in the subjoined claims.

Having described my invention, what I claim is:

1. In an apparatus for separating solids from a current of gas, the combination of an upright chamber; means for causing the current to flow upwardly through said chamber; a plurality of baffles pivoted in said chamber so as to hang substantially vertically and be rotated about their pivots by said current and thereby provide surfaces for obstructing solid particles in said current; and means on said baffles for limiting the degree of rotation to provide a sinuous passage for said current between said baffles, said baffles being arranged in spaced groups extending diagonally upwards from the sides of the chamber.

2. In an apparatus for separating solids from a current of gas, the combination of an upright chamber; means for causing the current to flow upwardly through said chamber; a plurality of brackets mounted in said chamber; a plurality of rods mounted on each of said brackets; a baffle pivoted on each of said rods so as to hang substantially vertically therefrom; and an ear on at least one end of the upper edge of said baffles, the parts being so related that the baffles are interposed in the path of flow of said current to be rotated about their pivots by said current to provide surfaces for obstructing solid particles in said current, and the ears engaging the brackets to limit the degree of said rotation to provide a sinuous passage for said current between said baffles.

3. In an apparatus for separating solids from a current of gas, the combination of an upright chamber; means for causing the current to flow upwardly through said chamber; a plurality of baffles pivoted in said chamber so as to hang substantially vertically and be rotated about their pivots by said current and thereby provide surfaces for obstructing solid particles in said current; said baffles being arranged in spaced groups extending diagonally upwards from the sides of the chamber in staggered relation; means on said baffles for limiting the degree of rotation to provide a sinuous passage for said current between said baffles; a hopper below said chamber, said chamber having a plurality of vents discharging into said hopper; a discharge conduit for said hopper; and a container removably disposed below said conduit.

4. In an apparatus for separating solids from a current of gas, the combination of an upright chamber; means for causing the current to flow upwardly through said chamber; a plurality of baffles pivoted in said chamber so as to hang substantially vertically and be rotated about their pivots by said current and thereby provide surfaces for obstructing solid particles in said current; means on said baffles for limiting the degree of rotation to provide a sinuous passage for said current between said baffles; a plurality of spray-heads in said chamber; a hopper below said chamber, said chamber having a plurality of vents discharging into said hopper; a tank below said hopper; a discharge conduit for said hopper communicating with said tank; a container provided with a perforated bottom removably disposed in said tank below said conduit; and means for supplying water from said tank to said spray-heads.

5. In an apparatus for separating solids from a current of gas, the combination of a stack; an upright chamber mounted adjacent said stack; an inlet duct from said stack to the lower end of said chamber; a discharge duct from the upper end of said chamber to said stack; a damper in said stack between said ducts; a plurality of baffles pivoted in said chamber so as to hang substantially vertically and be rotated about their pivots by said current and thereby provide surfaces for obstructing solid particles in said current; said baffles being arranged in spaced groups extending diagonally upwards from the sides of the chamber in staggered relation; and means on said baffles for limiting the degree of rotation to provide a sinuous passage for said current between said baffles.

6. In an apparatus for separating solids from a current of gas, the combination of a stack; an upright chamber mounted adjacent said stack; an inlet duct from said stack to the lower end of said chamber; a discharge duct from the upper end of said chamber to said stack; a damper in said stack between said ducts; a plurality of baffles pivoted in said chamber so as to hang substantially vertically for rotation by said current; said baffles being arranged in spaced groups extending diagonally upwards from the sides of the chamber in staggered relation; means for limiting the degree of rotation of said baffles to provide a sinuous passage for said current between said baffles; a hopper below said chamber, said chamber having a plurality of vents discharging into said hopper; a discharge conduit for said hopper; and a container removably disposed below said conduit.

7. In an apparatus for separating solids from a current of gas, the combination of a plurality of stacks; an upright chamber disposed adjacent said stacks and having a discharge throat at its top; supply ducts connecting said stacks, respectively, with the lower end of said chamber, dampers in said stacks, respectively, above said ducts, a plurality of baffles pivoted in said chamber so as to hang substantially vertically and be rotated about their pivots by said current and thereby provide surfaces for obstructing solid particles in said currents; and means on said baffles for limiting the degree of rotation to provide a sinuous passage for said current between said baffles.

8. In an apparatus for separating solids from a current of gas flowing through a stack, the combination of a shroud mounted on top of the stack and having a discharge throat at its top; an upright chamber supported in said shroud and having its lower end open and in said stack and its upper end provided with a plurality of sinuous ducts communicating with said discharge throat; a plurality of baffles pivoted in said chamber so as to hang substantially vertically and be rotated about their pivots by said current and thereby provide surfaces for obstructing solid particles in said current; and means on said baffles for limiting the degree of rotation to provide a sinuous passage for said current between said baffles.

9. In an apparatus for separating solids from a current of gas flowing through a stack, the combination of a casing mounted on said stack and having a discharge opening co-axial with said stack; a damper for said opening; a shroud mounted on said casing and having a discharge throat at its top; an upright chamber supported in said shroud and having its lower end communicating with said casing and its upper end provided with a plurality of sinuous ducts communicating with said discharge throat; a plurality of baffles pivoted in said chamber so as to hang substantially vertically and be rotated about their pivots by said current and thereby provide surfaces for obstructing solid particles in said current; and means on said baffles for limiting the degree of rotation to provide a sinuous passage for said current between said baffles.

THOMAS K. STEVENSON.

REFERENCES CITED

The following references are of record in the file of this patent:

UNITED STATES PATENTS

| Number | Name | Date |
| --- | --- | --- |
| 984,394 | Romig | Feb. 14, 1911 |
| 1,009,963 | Gamblin | Nov. 28, 1911 |
| 1,107,986 | Muller | Aug. 18, 1914 |
| 1,177,129 | Mulvany | Mar. 28, 1916 |
| 1,493,579 | Walker | May 13, 1924 |
| 1,570,577 | Romero | Jan. 19, 1926 |

FOREIGN PATENTS

| Number | Country | Date |
| --- | --- | --- |
| 262,921 | Germany | July 26, 1913 |
| 350,573 | Germany | Mar. 21, 1922 |